Patented May 20, 1952

2,597,676

UNITED STATES PATENT OFFICE 2,597,676

COMPLEX CHROMIUM COMPOUNDS OF O.O'-DIHYDROXY AZO DYESTUFFS

Guido Schetty, Basel, Switzerland, assignor to J. R. Geigy A. G., Basel, Switzerland, a Swiss firm No Drawing. Application May 28, 1951, Serial No. 228,750. In Switzerland July 6, 1950

5 Claims. (Cl. 260—151)

The present invention concerns the production of chrome containing monoazo dyestuffs which have no sulphonic acid groups and which are suitable for dyeing natural and artificial protein fibres and textiles made up therefrom and also leather in violet shades. In particular it concerns the production of violet and violet-brown to violet-grey complex chromium compounds from o.o'-dihydroxy azo dyestuffs which have no sulphonic acid groups and which can be dyed from a weakly acid aqueous medium.

Many complex chromium compounds of o.o'-dihydroxy azo dyestuffs having sulphonic acid groups are technically very valuable because they produce very fast to light and level wool dyeings when dyed by a suitable method. The most usual dyeing method consists in boiling the goods for more than an hour in a bath containing from 6–10% of sulphuric acid calculated on the weight of the wool in order to attain a level dyeing in the desired shade. This dyeing method, however, cannot be used for wool of the finest quality as it damages the fibres. It is true that single representatives of this class of dyestuffs do draw on to wool from a weakly acid medium completely exhausting the dyebath, but under these conditions they produce only uneven empty dyeings. It would be very desirable, therefore, to find chrome containing o.o'-dihydroxy azo dyestuffs which can be dyed evenly on to wool under the conditions which do not damage the fibres.

The surprising observation has now been made that the o.o'-dihydroxy azo dyestuffs having no sulphonic acid groups of the following general formula:

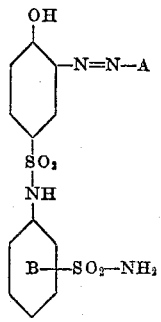

wherein A represents the radical of a hydroxy-naphthalene coupling component capable of being coupled in the o-position to the hydroxyl group and wherein the aromatic radicals A and B may contain the further non-ionogenic substituents usual in azo dyestuffs, can be converted with chrome producing agents by methods known per se into the violet complex chrome compounds. These compounds are distinguished by their good drawing power on to protein and related fibres.

The diazo components necessary for the production of the o,o-dihydroxy azo dyestuffs usable according to this invention are obtained by the condensation of 4-chloro-3-nitrobenzene sulphonic acid chloride with aminobenzene sulphonic acid amides to the corresponding 4-chloro-3-nitrobenzene sulphonic acid phenylamides, the exchange of a chlorine atom for a hydroxyl group by heating in a caustic alkaline solution and reduction of the nitro group to an amino group. As coupling components may be used for example 2-hydroxynaphthalene, 6-bromo-2-hydroxynaphthalene, 7-methoxy-2-hydroxynaphthalene, 1-hydroxynaphthalene (coupled in a strong caustic alkaline solution), 4-methyl-1-hydroxynaphthalene, 5-chloro-1-hydroxynaphthalene or 5.8-dichloro-1-hydroxynaphthalene. Apart from the usual salts of trivalent chromium also complex salts may be used as chrome producing agents, e. g. chromium salicylic acid alkali salts or alkali oxalatochromiates which have proved to be very favourable in amounts corresponding to 1 chrome atom per 2 dyestuff molecules. Chroming can generally be performed open, or under pressure, in a neutral, acid or alkali medium, in water or in the presence of organic solvents.

The new chrome containing dyestuffs dye wool, particularly also mixtures of wool of various origin, from a neutral or weakly acid bath in very even, full shades of violet and violet-brown to violet-grey which are very fast to light. At the same time, the drawing and levelling powers are partly dependent on the position of the sulfamyl group in the sulphonic acid phenylamide radical of the diazo component; generally dyestuffs with the sulfamyl group in the o-position to the sulfimide group have somewhat better levelling powers but do not draw as well as the corresponding dyestuffs with the sulfamyl group in a different position.

There are, of course, already complex chrome compounds of o.o'-dihydroxy azo dyestuffs not having sulphonic acid groups which contain the sulphonic acid amide groups as substituents direct in the aromatic radicals of the diazo components or coupling component and which dye wool from a weakly acid bath. These dyestuffs, however, have the disadvantage of insufficient water solubility so that they can only be used in the presence of dispersing agents. In contrast to this, the new dyestuffs are sufficiently water soluble and can, therefore, be used without dispersing agents. In addition, the new chrome containing dyestuffs give dyeings of better fastness to milling when compared with the corresponding dyestuffs which have a sulfamyl group instead of as according to this invention a sulphonic acid sulfamylphenyl amide group in the diazo component.

The following examples illustrate the invention without limiting it in any way. Where not otherwise stated, parts are given as parts by weight and the temperatures are in degrees centigrade. The relationship of parts by weight to parts by volume is that of kilogrammes to litres.

Example 1

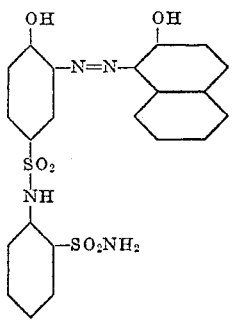

34.3 parts of 2-amino-1-phenyl-4-sulfanilide-2'-sulfamide are dissolved in 200 parts of water and 22 parts of conc. hydrochloric acid and added dropwise at 0–3° to a solution of 6.9 parts of sodium nitrite in 14 parts of water. The diazonium compound precipitates as a yellow crystal mass. The compound is made neutral to Congo red paper by the addition of sodium bicarbonate and then it is poured into an ice cold solution of 15.1 parts of 2-naphthol, 4.2 parts of sodium hydroxide and 12 parts of dehydrated soda in 135 parts of water. The mixture is stirred for some hours at 0–3°. A dark blue solution is formed from which the dyestuffs may be salted out and filtered off. While still damp, the dyestuff is heated for 5 hours in 750 parts of water with 110 parts of a solution of ammonium chromosalicylate (corresponding to 4.2 parts $Cr_2O_3$), after which 72 parts of common salt are added while it is still hot. The dyestuff which precipitates as a powder is filtered and dried. The powder has a blue-black colour and dissolves well in hot water. It dyes wool from an acetic acid bath in brown-violet colours which have excellent light fastness properties and are very fast to washing, milling and sea water.

Example 2

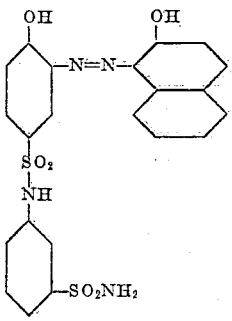

34.3 parts of 2-amino-1-phenol-4-sulfanilide-3'-sulfamide are dissolved in 200 parts of water and 11 parts by volume of 10-n caustic soda lye, cooled, and a solution of 6.9 parts of sodium nitrite in 14 parts of water is added. It is then added dropwise at 20–22° while stirring to a solution of 165 parts of water and 31 parts of conc. hydrochloric acid. The dropwise addition should be completed within 3 hours. The diazo compound which precipitates in the form of yellow crystals is neutralised by the addition of sodium bicarbonate and poured into a solution of 15.1 parts of 2-naphthol, 10.5 parts by volume of 10-n caustic soda lye and 12 parts of dehydrated soda which has been cooled to 2°. The mixture is then stirred for several hours at 0–5° until the dyestuff is completely formed, then it is heated to 70°, 135 parts of common salt are slowly added, it is allowed to cool to 40° and the dyestuff is then filtered off. While still damp, the monoazo dyestuff in 330 parts of water is heated under reflux whereupon the greater part of the dyestuff forms a solution. 110 parts of a solution of ammonium chromo-salicylate (corresponding to 4.2 parts $Cr_2O_3$) are slowly added dropwise and the solution is then boiled for 15 hours and then allowed to cool. The chrome containing dyestuff precipitates as an oil at the boil and on cooling it becomes crystalline. It is filtered off and dried. It forms a dark powder which dissolves well in hot water. It dyes wool from a neutral or weakly acid bath in brown-violet shades of very good washing, milling and sea water fastness. The good fastness to light of these dyeings is remarkable.

Dyestuffs with similar properties are obtained if 35.7 parts of 2-amino-1-phenol-4-sulf-(2'-methyl-5'-sulfamyl)-anilide, 35.7 parts of 2-amino-1-phenol-4-sulf-(4'-methyl-5'-sulfamyl)-anilide or 34.3 parts of 2-amino-1-phenol-4-sulfanilide-4'-sulfamide are used instead of 2-amino-1-phenol-4-sulfanilide-3'-sulfamide, or when in the above cases 7-methoxy-2-naphthol or 6-bromo-2-naphthol are used as coupling components.

Example 3

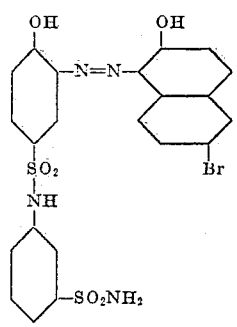

34.3 parts of 2-amino-1-phenol-4-sulfanilide-3'-sulfamide are diazotised as described in Example 2 and the diazo compound which has been neutralised with sodium bicarbonate is poured at 0–3° into a solution of 23.3 parts of 6-bromo-2-naphthol, 12.3 parts by volume of 10-n caustic soda lye and 12 parts of dehydrated soda in 300 parts of water. The dyestuff is completely formed after stirring for 12 hours at 0–3°. The solution is warmed to 40°, the dyestuff is salted out and filtered off. While still damp the monoazo dyestuff is boiled under reflux for 20 hours while stirring in 1000 parts of hot water and 120 parts of a solution of ammonium chromo-salicylate (corresponding to 4.6 parts $Cr_2O_3$). The dyestuff precipitates as a powder and is filtered off and dried. The new chrome containing dyestuff dissolves well in hot water with a violet colour. It dyes wool from a neutral bath in violet shades which are very fast to washing, sea water and light.

If 6-bromo-2-naphthol is replaced in the above example by 18.3 parts of 7-methoxy-2-naphthol, then a dyestuff is obtained the dyeings of which are more blue. These dyeings differ from those in the above example by better fastness to alkali but somewhat less good fastness to stoving.

*Example 4*

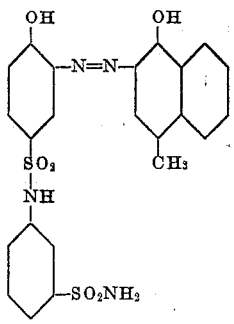

34.3 parts of 2-amino-1-phenol-4-sulfanilide-3'-sulfamide are diazotised and coupled with 16.4 parts of 4-methyl-1-naphthol in the manner described in Example 2. The monoazo dyestuff so obtained is boiled for 20 hours in 1000 parts of water and 120 parts of a solution of ammonium chromo-salicylate (corresponding to 4.6 parts of $Cr_2O_3$). The chrome containing dyestuff which precipitates in powder form is filtered off and dried. It is a dark powder which easily dissolves in hot water and dyes wool from a neutral bath in violet-grey shades which are fast to washing and sea water.

If in the above example the 2-amino-1-phenol-4-sulfanilide-3'-sulfamide is replaced by 35.7 parts of 2-amino-1-phenol-4-sulf-(2'-methyl-5'-sulfamyl)-anilide, a dyestuff with similar properties is obtained.

*Example 5*

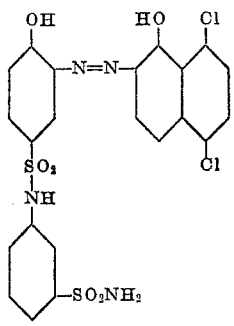

34.3 parts of 2-amino-1-phenol-4-sulfanilide-3'-sulfamide are diazotised, neutralised with sodium bicarbonate and then stirred into a solution of 22.4 parts of 5.8-dichloro-1-naphthol, 5.3 parts of sodium hydroxide and 15 parts of dehydrated soda in 170 parts of water. After the dyestuff has formed, i. e. in about 15 hours, the solution is heated to 70° and as much common salt as necessary is added to precipitate the dyestuff. The dyestuff precipitates as an oil which on cooling congeals into a brittle mass. The dyestuff is filtered off and heated to boiling for 24 hours under reflux with 500 parts of water and 150 parts of a solution of ammonium chromo-salicylate (corresponding to 5.7 parts of $Cr_2O_3$). During the chroming process, the dyestuff, which at first precipitates as a sticky substance is converted into a finely crystalline residue which, after cooling is filtered off and dried. The dyestuff is mixed with 10% of its own weight of dehydrated soda to improve the solubility. It forms a blue powder which easily dissolves in hot water. The new chrome containing dyestuff dyes wool from a neutral or weakly acid bath in dull violet shades which are very fast to light.

If in the above example the 2-amino-1-phenol-4-sulfanilide-3'-sulfamide is replaced by 35.7 parts of 2-amino-1-phenol-4-sulf-(4'-methyl-5'-sulfamyl)-anilide, a dyestuff with similar properties is obtained.

2-amino-1-phenol-4-sulfanilide - 3' - sulfamide is produced as follows: 172 parts of 1-aminobenzene-3-sulfamide are dissolved in 1200 parts of water at 60° and then 275 parts of 1-chloro-2-nitrobenzene-4-sulfochloride are added while stirring at 60–75°. A weakly alkaline reaction is maintained by the addition of soda from time to time. The crystalline mass which is formed is filtered off, washed with water and dried. 391.5 parts of 1-chloro-2-nitrobenzene-4-sulfanilide-3'-sulfamide are dissolved in 700 parts of caustic soda lye (corresponding to 80 parts of sodium hydroxide), the solution is heated to boiling then 300 parts of caustic soda lye (corresponding to 88 parts of sodium hydroxide) are added within 15 minutes. After boiling for 5 hours, the deep yellow coloured solution is neutralised with concentrated hydrochloric acid, a solution of 150 parts of sodium sulphide in 300 parts of water is added and the solution is boiled for a further two hours. The hot solution is quickly acidified by adding concentrated hydrochloric acid, the sulphur which precipitates is filtered off and sodium acetate is added to the filtrate until a weak congo violet reaction is obtained. On cooling, the 2-amino-1-phenol-4-sulfanilide-3'-sulfamide precipitates as a plastic mass which congeals into a crystalline mass on standing.

2-amino-1-phenol-4-sulfanilide - 2' - sulfamide and 2-amino-1-phenol-4-sulfanilide-4'-sulfamide are obtained if 172 parts of 1-aminobenzene-2-sulfamide or 172 parts of 1-aminobenzene-4-sulfamide are used instead of 172 parts of 1-aminobenzene-3-sulfamide in the above reaction.

2-amino-1-phenol-4-sulf-(2'-methyl-5' - sulf - amyl)-anilide and 2-amino-1-phenol-4-sulf-(4'-methyl-5'-sulfamyl)-anilide are obtained if 186 parts of 2-methyl-1-aminobenzene-5-sulfamide or 186 parts of 4-methyl-1-aminobenzene-5-sulfamide are used instead of 172 parts of 1-aminobenzene-3-sulfamide in the above reaction.

What I claim is:
1. The complex chromium compound of a monoazo dyestuff having the general formula:

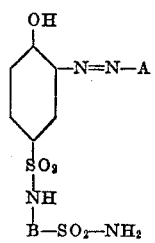

wherein A represents a naphthalene nucleus containing an OH group in the o-position to the azo group and B represents a benzene nucleus, A and B being otherwise free from carboxylic acid and sulphonic acid groups.

2. The complex chromium compound of a monoazo dyestuff having the general formula:

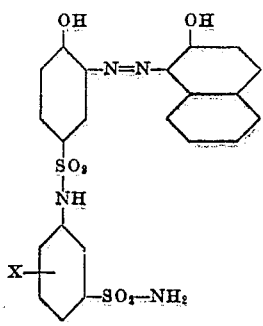

wherein X represents a member selected from the group consisting of H and $CH_3$.

3. The complex chromium compound of a monoazo dyestuff having the formula:

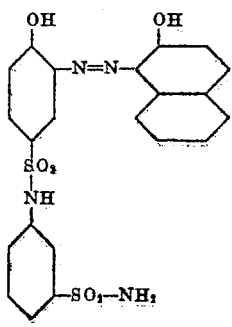

4. The complex chromium compound of a monoazo dyestuff having the formula:

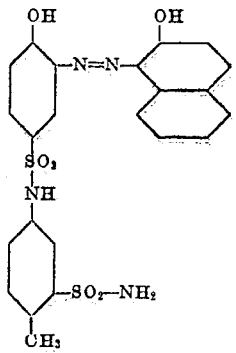

5. The complex chromium compound of a monoazo dyestuff having the formula:

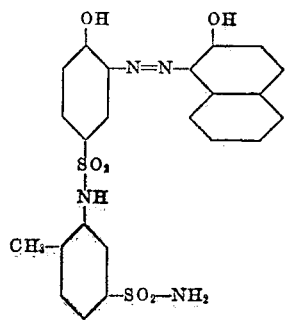

GUIDO SCHETTY.

No references cited.